United States Patent Office 3,168,252
Patented Feb. 2, 1965

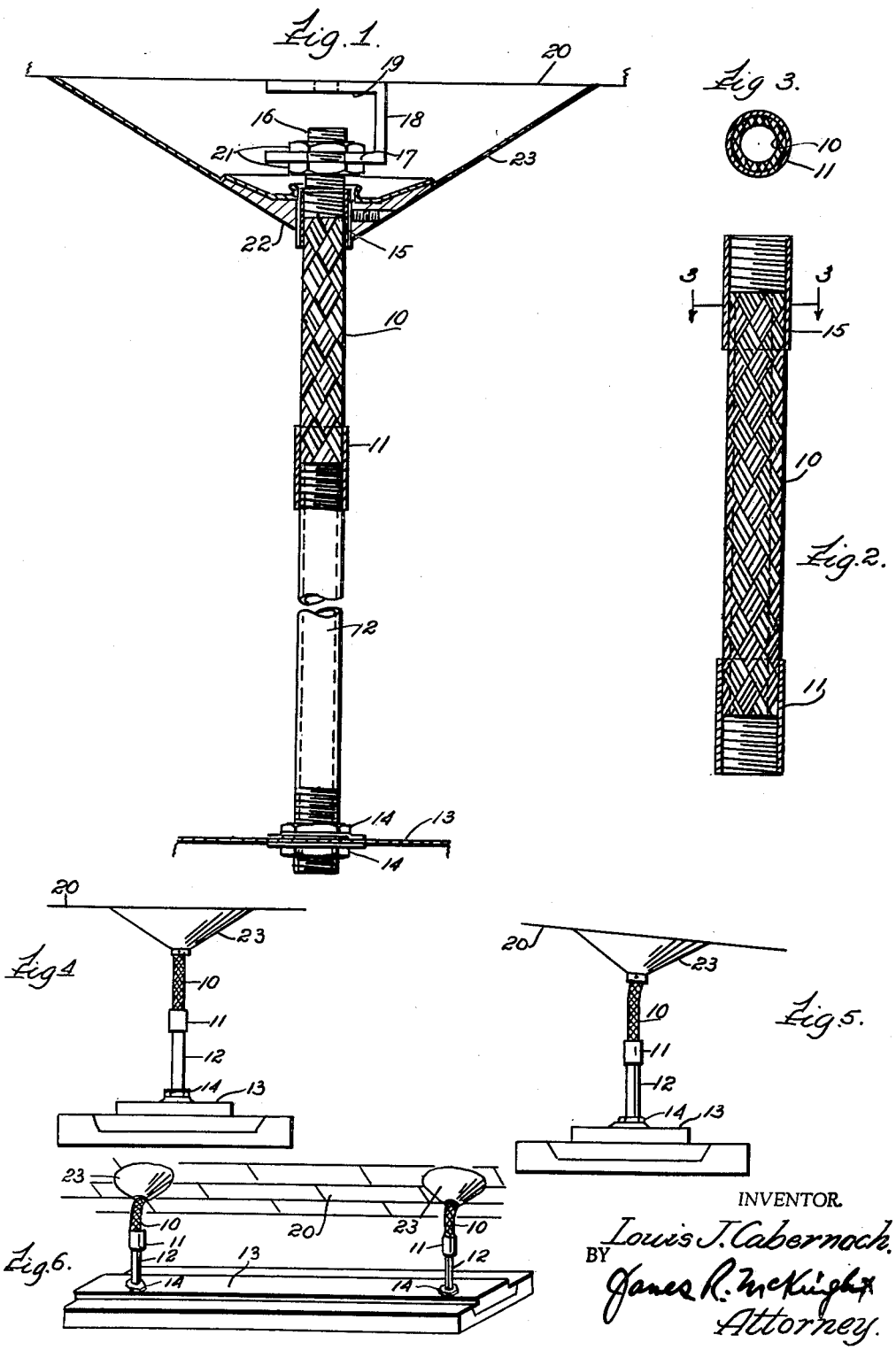

3,168,252
FLEXIBLE FIXTURE SUSPENSION
Louis J. Cabernoch, Chicago, Ill., assignor to Curtis-Electro Lighting, Inc., Chicago, Ill., a corporation of Illinois
Filed Nov. 6, 1963, Ser. No. 321,858
1 Claim. (Cl. 240—78)

My invention relates to a suspension attachable to a ceiling having a flexible member which will permit a fixture held by said suspension to hang in a horizontal position regardless of the angle of the ceiling.

Among the objects of my invention is to provide a suspension for a fixture adapted to be attached to a ceiling and having a flexible member for compensating for the angle of a non-horizontal inclined ceiling, so as to permit a fixture attached to the suspension to hang in a horizontal position.

My invention also contemplates such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Referring to the drawings, FIG. 1 is a detailed sectional view of my flexible fixture suspension; FIG. 2 is a vertical elevational view of my flexible hose; FIG. 3 is a detailed sectional view on line 3—3 of FIG. 2; FIG. 4 is a reduced end view of my flexible fixture suspension attached to a horizontal ceiling; FIG. 5 is a similar view attached to a non-horizontal ceiling; and FIG. 6 is a perspective view of two of my flexible fixture suspensions holding a hanging fixture and attached to a non-horizontal ceiling.

The embodiment selected to illustrate by invention comprises a flexible hose or tube 10, preferably made of braided or woven steel wire, onto the lower portion of which is swaged or otherwise suitably attached a coupling 11. The coupling 11 extends beyond or below said hose 10 and its lower open end portion is screw threaded to engage and receive the upper screw threaded end of fixed tubing 12 preferably of steel. The opposite lower end of tubing 12 extends through fixture 13 and is screw threaded to receive screw threaded nuts 14 above and below fixture 13 for engagement therewith.

Bushing 15 is swaged onto or otherwise suitably attached to the upper portion of flexible hose 10 and extends beyond or above it with an upper screw threaded portion 16 to receive the lower leg 17 of a hickey 18, the upper leg 19 of which is attached to ceiling 20. Both above and below lower leg 17 a nut 21 is screw threaded on screw threaded portion 16.

To cover the foregoing attachment to a ceiling, I may provide a decorator nut 22 extending around and engaging bushing 15 and supporting canopy 23.

In use when ceiling 20 to which the foregoing attachment is made is not horizontal, but is at an inclined angle, flexible hose 10 compensates for this inclined angle and still permits fixture 13 to hang horizontally.

Prior to the use of applicant's flexible hose 10, it was customary to extend tubing 12, which was fixed and not flexible for attachment by the hickey to the ceiling. Such a non-flexible and rigid tubing 12 when so attached to a non-horizontal ceiling then held the fixture 13 in a non-horizontal position and at an angle which was unattractive in appearance and faulty in its operation.

Since there are frequent occasions when the ceiling to which the fixture is to be attached is not horizontal, because of faulty building, or age, or other reasons, and it is undesirable or expensive to support the fixture by any other means than the ceiling, applicant's invention solves the problem of using this ceiling as a support and still providing a horizontal hanging fixture.

My flexible hose 10 in practical use is usually four inches in extent and should not be less than four inches in extent. It may be longer in extent, but is usually the minimum extent of four inches for economic reasons. The fixture which is supported in hanging position by my suspension is preferably a lighting fixture as shown for illustration in the drawings, but the fixture may be in the plumbing, clock or directional sign fields. The fixture is from five to forty pounds in weight. When the fixture is more than two feet in extent, it is customary to suspend it from the ceiling by two spaced suspensions instead of a single suspension.

My hose 10 and tubing 12 are, of course, hollow, so that they may house insulated wires leading through the ceiling to an electrical source of supply on one end and to the light fixture 13 for illuminating the same in use.

Having thus described my invention, I claim:

A lighting fixture suspension comprising a non-horizontal ceiling, a pair of spaced suspension members, each of said members having hollow attaching means rigidly attached at its upper portion to said ceiling, a hollow bushing rigidly attached at its upper portion to the lower portion of said attaching means, a hollow flexible hose of woven steel wire and at least four inches in length, said flexible hose attached at its upper portion to the lower portion of said bushing, and a rigid tubing attached at its upper portion to the lower portion of said flexible hose, said rigid tubing being of larger extent than said flexible hose, and a lighting fixture attached to the lower portion of said rigid tubing of each of said spaced suspension members, said fixture being more than two feet in extent and between five and forty pounds in weight and adapted by its weight to cause said flexible hose to move to compensate for the inclined angle of the non-horizontal ceiling and permit said fixture to hang in horizontal position.

References Cited by the Examiner
UNITED STATES PATENTS

| | | | |
|---|---|---|---|
| 1,234,607 | 7/17 | Berkowitz | 240—2.14 |
| 1,300,827 | 4/19 | Dormandy | 240—78 |
| 1,342,787 | 6/20 | White | 240—88 |
| 1,509,559 | 9/24 | Jennings | 240—85 |
| 1,825,920 | 10/31 | Popp | 240—51 |
| 2,586,908 | 2/52 | Berry | 240—51 |
| 2,937,841 | 5/60 | Bodian | 240—85 |

FOREIGN PATENTS 311,055   2/19   Germany.

NORTON ANSHER, *Primary Examiner.*